United States Patent
Park et al.

(10) Patent No.: US 8,060,739 B2
(45) Date of Patent: Nov. 15, 2011

(54) APPARATUS AND METHOD FOR PROVIDING SECURITY SERVICE IN HOME NETWORK

(75) Inventors: Kyung-Mo Park, Suwon-si (KR); Seung-Jae Oh, Seoul (KR); Hyoung-shick Kim, Suwon-si (KR); Young-sun Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 855 days.

(21) Appl. No.: 12/098,510

(22) Filed: Apr. 7, 2008

(65) Prior Publication Data

US 2010/0325421 A1 Dec. 23, 2010

Related U.S. Application Data

(60) Provisional application No. 60/907,547, filed on Apr. 6, 2007.

(30) Foreign Application Priority Data

Apr. 1, 2008 (KR) .......................... 10-2008-0030416

(51) Int. Cl.
*H04L 29/06* (2006.01)

(52) U.S. Cl. ........ 713/153; 713/151; 713/156; 713/168; 713/169; 726/3; 726/12; 709/203; 709/218; 709/231

(58) Field of Classification Search .................. 713/153, 713/151, 156, 168, 169; 726/3, 12; 709/203, 709/218, 231
See application file for complete search history.

(56) References Cited

U.S. PATENT DOCUMENTS

| | | | | |
|---|---|---|---|---|
| 6,920,556 | B2* | 7/2005 | Kuehr-McLaren et al. | 713/151 |
| 6,948,076 | B2* | 9/2005 | Saito | 726/12 |
| 7,165,175 | B1* | 1/2007 | Kollmyer et al. | 713/154 |
| 2004/0059945 | A1* | 3/2004 | Henson et al. | 713/201 |
| 2005/0081026 | A1* | 4/2005 | Thornton et al. | 713/156 |
| 2005/0256924 | A1* | 11/2005 | Chory et al. | 709/203 |
| 2006/0129837 | A1* | 6/2006 | Im et al. | 713/184 |
| 2006/0174026 | A1* | 8/2006 | Robinson et al. | 709/231 |
| 2006/0195886 | A1* | 8/2006 | Ashley | 725/138 |
| 2006/0264202 | A1* | 11/2006 | Hagmeier et al. | 455/411 |
| 2007/0061870 | A1* | 3/2007 | Ting et al. | 726/3 |
| 2007/0061873 | A1* | 3/2007 | Shewchuk et al. | 726/10 |
| 2007/0250596 | A1* | 10/2007 | Baugher | 709/218 |

FOREIGN PATENT DOCUMENTS

KR 10-2003-0073180 A 9/2003

* cited by examiner

*Primary Examiner* — Nabil El Hady
(74) *Attorney, Agent, or Firm* — Sughrue Mion, PLLC

(57) ABSTRACT

An apparatus and method for providing a security service is provided. The apparatus includes a reception module which receives first data including a first public key and marked with a security ID, the first public key being one of a pair of public keys necessary for providing a security service to a home server and the security ID indicating that the first data needs to be encrypted; a response generation module which generates second data by encrypting part of a response message for the first data; and a transmission module which transmits the second data to a home server in a home network.

20 Claims, 7 Drawing Sheets

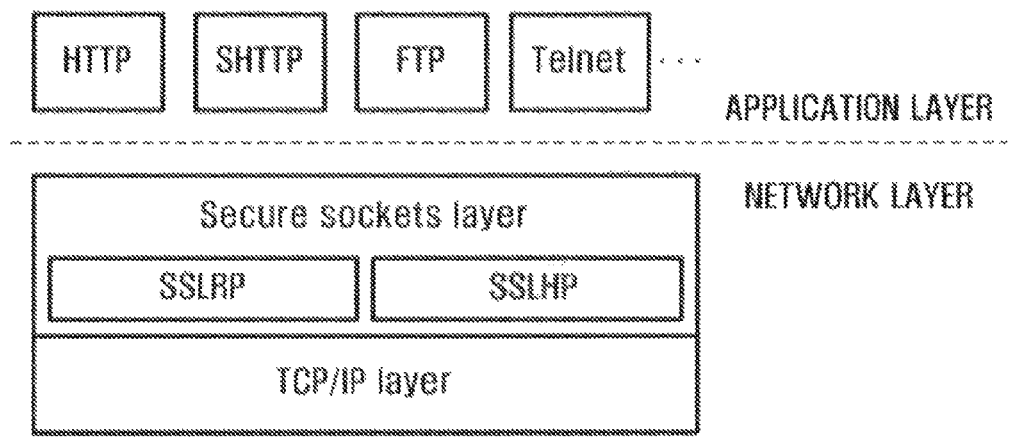

APPARATUS AND METHOD FOR PROVIDING SECURITY SERVICE IN HOME NETWORK

CROSS-REFERENCE TO RELATED PATENT APPLICATIONS

This application claims priority from U.S. Patent Application No. 60/907,547, filed on Apr. 6, 2007 in the U.S. Patent and Trademark Office, and Korean Patent Application No. 10-2008-0030416, filed on Apr. 1, 2008 in the Korean Intellectual Property Office, the disclosures of which are incorporated herein by reference in their entirety.

BACKGROUND OF THE INVENTION

1. Field of the Invention

Apparatuses and methods consistent with the present invention relate to providing a security service in a home network, and more particularly, to providing a security service in a home network, which can decrease the complexity of messages transmitted within the home network and decrease the amount of computation required for setting and maintaining security.

2. Description of the Related Art

With the advent of the Internet, the frequency of data transmission between computers has increased, and the demand for protecting data transmitted over networks has steadily grown. The protection of data transmitted over networks is referred to as network security, which is differentiated from computer system security.

Network security may be performed in an Open System Interconnection (OSI) layer such as an application or a network layer. For example, in an IEEE 802.11-based wireless local area network (WLAN), the protection of data transmitted over wireless communication is carried out in a network layer by using a security technique such as Wired Equivalency Privacy (WEP) or WiFi Protected Access (WPA).

In a related art network security scheme, a server provides a public key and a server authenticating certificate, which is a public key certificate authenticated with an electronic signature by a certifying authority, to a client when the client accesses the server. Then, the client determines whether the server authenticating certificate has been signed by a reliable certifying authority and whether the server authenticating certificate is valid, and extracts the public key from the server authenticating certificate. Thereafter, the client encrypts an arbitrary message to be used as a session key with the extracted public key and transmits the encrypted arbitrary message to the server. The server decrypts the encrypted arbitrary message with its private key, thereby restoring the session key. Thereafter, the server encrypts a message with the restored session key by using a symmetric key encryption method, and transmits the encrypted message to the client.

However, the above-mentioned related art network security scheme involves encrypting and transmitting all messages regardless of whether the messages are for upper-layer applications, which increases the complexity of messages and decreases the speed of data transmitted over networks. Further, the above-mentioned related art network security scheme requires both a server and a client to obtain a certificate from a certificate authority and to authenticate the certificate in order to realize a secure communication between the server and the client, and thus may not be suitable for use in a home network including a plurality of consumer electronics (CE) devices.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, the present invention provides an apparatus and method for providing a security service in a home network, which can decrease the amount of computation required for setting and maintaining security and decrease the complexity of messages when a plurality of devices communicate with each another in the home network.

According to an aspect of the present invention, there is provided an apparatus for providing a security service in a home network, the apparatus including: a security-identifier (ID) marking module which marks with a security ID part of first data that needs to be encrypted; an encoding module which encodes a first public key and the first data, the first public key being one of a pair of public keys necessary for providing a security service to a consumer electronics (CE) device in a home network; and a transmission module which transmits the encoded first data to the CE device.

According to another aspect of the present invention, there is provided an apparatus for providing a security service in a home network, the apparatus including: a reception module which receives first data including a first public key and marked with a security ID, the first public key being one of a pair of public keys necessary for providing a security service to a home server and the security ID indicating that the first data needs to be encrypted; a response generation module which generates second data by encrypting part of a response message for the first data; and a transmission module which transmits the second data to a home server in a home network.

According to another aspect of the present invention, there is provided a method of providing a security service in a home network, the method including: marking with a security ID part of first data that needs to be encrypted; encoding a first public key and the first data, the first public key being one of a pair of public keys necessary for providing a security service to a CE device in a home network; and transmitting the encoded first data to the CE device.

According to another aspect of the present invention, there is provided a method of providing a security service in a home network, the method including: receiving first data including a first public key and marked with a security ID, the first public key being one of a pair of public keys necessary for providing a security service to a home server and the security ID indicating that the first data needs to be encrypted; generating second data by encrypting part of a response message for the first data; and transmitting the second data to a home server in a home network.

BRIEF DESCRIPTION OF THE DRAWINGS

The above and other aspects of the present invention will become more apparent by describing in detail exemplary embodiments thereof with reference to the attached drawings, in which:

FIG. 2 illustrates a diagram of the structure of a security protocol that can be applied to the present invention;

FIG. 3 illustrates a diagram of a web page marked with a security identifier (ID), according to an exemplary embodiment of the present invention;

DETAILED DESCRIPTION OF THE EXEMPLARY EMBODIMENTS

Figure 1:
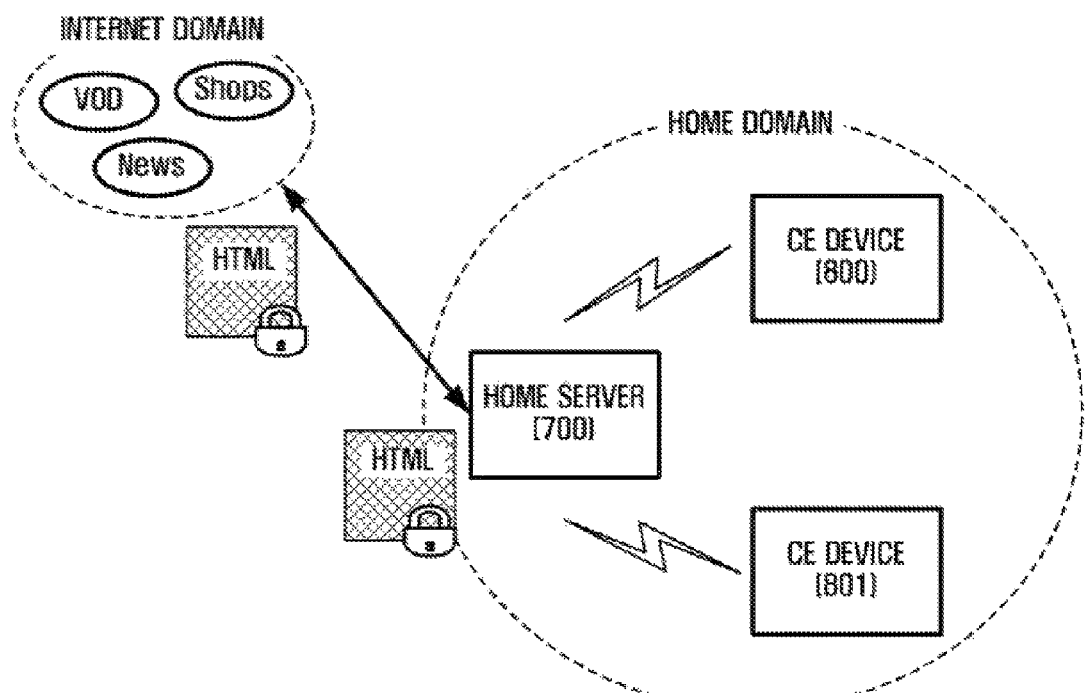
FIG. 1 illustrates a schematic diagram of a home network system according to an exemplary embodiment of the present invention.

The various aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 illustrates a schematic diagram of a home network system according to an exemplary embodiment of the present invention. Referring to FIG. 1, the home network system includes a home server 700 and one or more CE devices 800 and 801.

The home server 700 and the CE devices 800 and 801 may all support a remote user interface (UI). For example, the home server 700 may support Consumer Electronics Association (CEA)-2014 remote UI server, and the CE devices 800 and 801 may support CEA-2014 remote UI client. Accordingly, the CE devices 800 and 801 may request information from the home server 700 in a remote place, and the home server 700 then may acquire the information requested by the CE devices 800 and 801 from a web server (not shown) on the Internet and provide the acquired information to the CE devices 800 and 801. Here, web documents transmitted between the home server 700 and the CE devices 800 and 801 may be Hyper-Text Markup language (HTML).

The home server 700 and the CE devices 800 and 801 may support a security protocol of a network layer such as Secure Socket Layer (SSL). SSL, which is a type of security protocol for strengthening network security on the Internet, ensures the confidentiality and integrity of messages transmitted between a server and a client and provides security services such as the authentication of a server and the authentication of a client.

Referring to FIG. 2, SSL exists between a transmission protocol (e.g., Transmission Control Protocol/Internet Protocol (TCP/IP)) and an application protocol (e.g., Hypertext Transfer Protocol (HTTP), Secured HTTP (SHTTP), File Transfer Protocol (FTP) or Telnet). SSL includes an SSL record protocol (SSLRP) and an SSL handshake protocol (SSLHP).

The SSLHP determines and selects an encryption method or a key to be used between a server and a client. More specifically, the SSLHP establishes an encrypted session between a server and a client and shares session information between the server and the client during the encrypted session. Examples of the session information include a session key, an encryption algorithm, a compression algorithm and a certificate for a security service.

The SSLRP provides security services based on session information shared between a server and a client. For example, the SSLRP divides information into a number of basic units to encrypt the information.

The communication between the home server 700 and the CE device 800 will hereinafter be described in detail.

If the CE device 800 requests information, the home server 700 may communicate with a web server on the Internet with the use of HTTP or SHTTP and may thus acquire a web page from the web server.

Thereafter, the home server 700 may mark each part of the web page that needs to be secured with a security ID. Examples of information that needs to be secured include a user ID, password, social security number and credit card number. A predefined tag may be used as the security ID. For example, referring to FIG. 3, a credit card number and a social security number are each enclosed by tags <secrecy> and </secrecy>.

Prior to transmitting the web page marked with the security ID to the CE device 800, the home server 700 may determine whether a secure channel exists between the home server 700 and the CE device 800. Then, the home server 700 may use different communication methods to transmit the web page marked with the security ID, depending on whether a secure channel exists between the home server 700 and the CE device 800. This will hereinafter be described in detail with reference to FIGS. 4 and 5.

Figure 4:
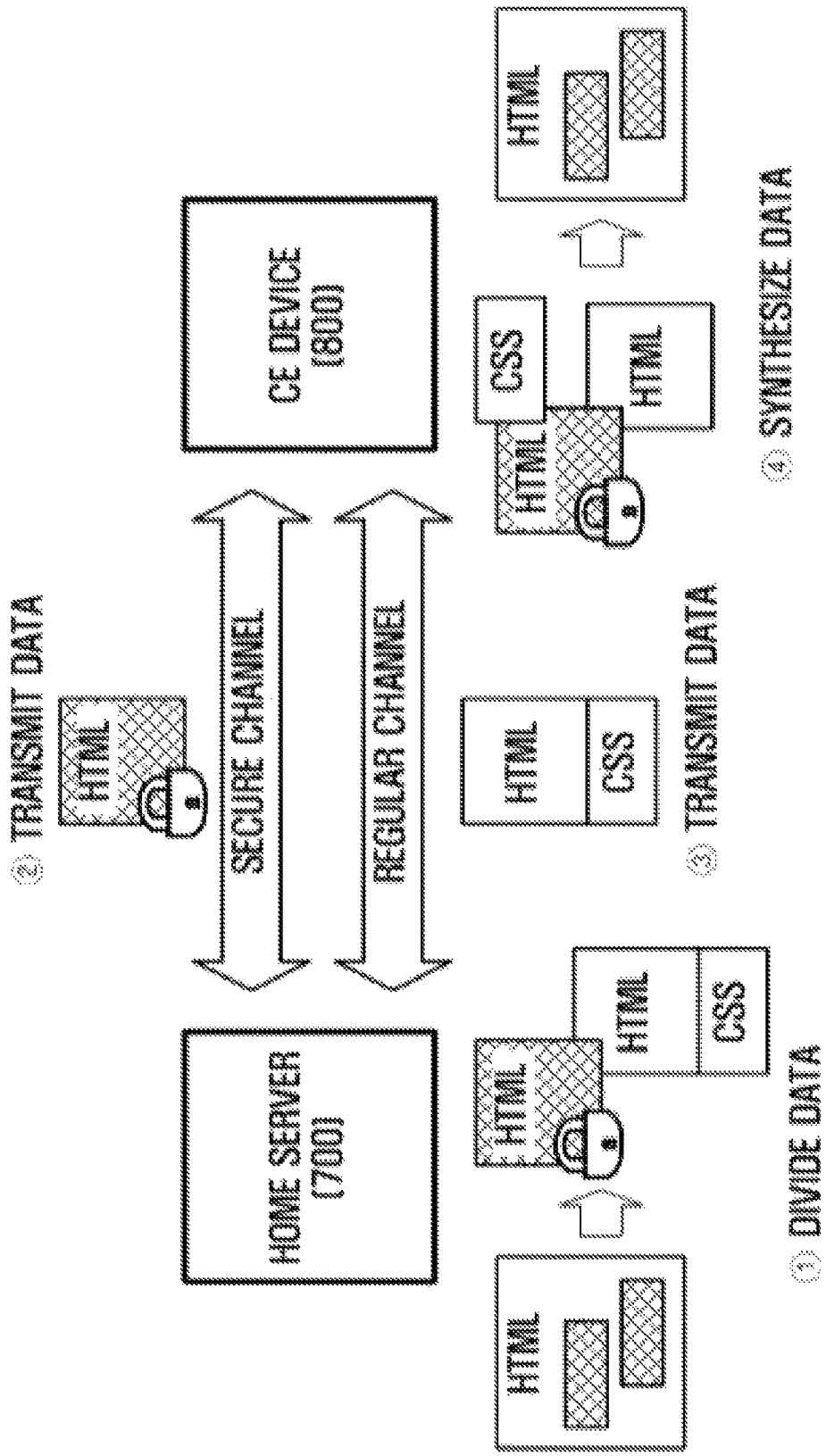
FIG. 4 illustrates a diagram for explaining the communication between a home server and a CE device when a secure channel exists between the home server and the CE device.

FIG. 4 illustrates a diagram for explaining the communication between the home server 700 and the CE device 800 when a secure channel exists between the home server 700 and the CE device 800.

Referring to FIG. 4, if a secure channel has already been established between the home server 700 and the CE device 800 by a security protocol such as SSL, the home server 700 may divide a web page into a first web page portion marked with a security ID and a second web page portion including no security ID (①). Then, the home server 700 may transmit the first web page portion to the CE device 800 through the secure channel (②), and transmits the second web page portion to the CE device 800 through a regular channel (③).

The CE device 800 may receive the first web page portion from the secure channel and the second web page portion from the regular channel. Thereafter, the CE device 800 generates the first and second web page portions (④) to restore the original web page. Thereafter, the CE device 800 provides the whole restored web page to a user. The CE device 800 may generate the first and second web page portions with reference to Cascading Style Sheet (CSS) of the first and second web page portions. CSS is a language used to describe the presentation of a document written in a markup language. CSS defines the style and the layout of web pages.

Thereafter, the CE device 800 may create a web document including personal information of the user as a response message for the first and second web page portions. Then, the CE device 800 may transmit the web document to the home server 700. Part of the web document marked with a security ID may be transmitted to the home server 700 through the secure channel, and the rest of the web document may be transmitted to the home server 700 through the regular channel.

Figure 5:
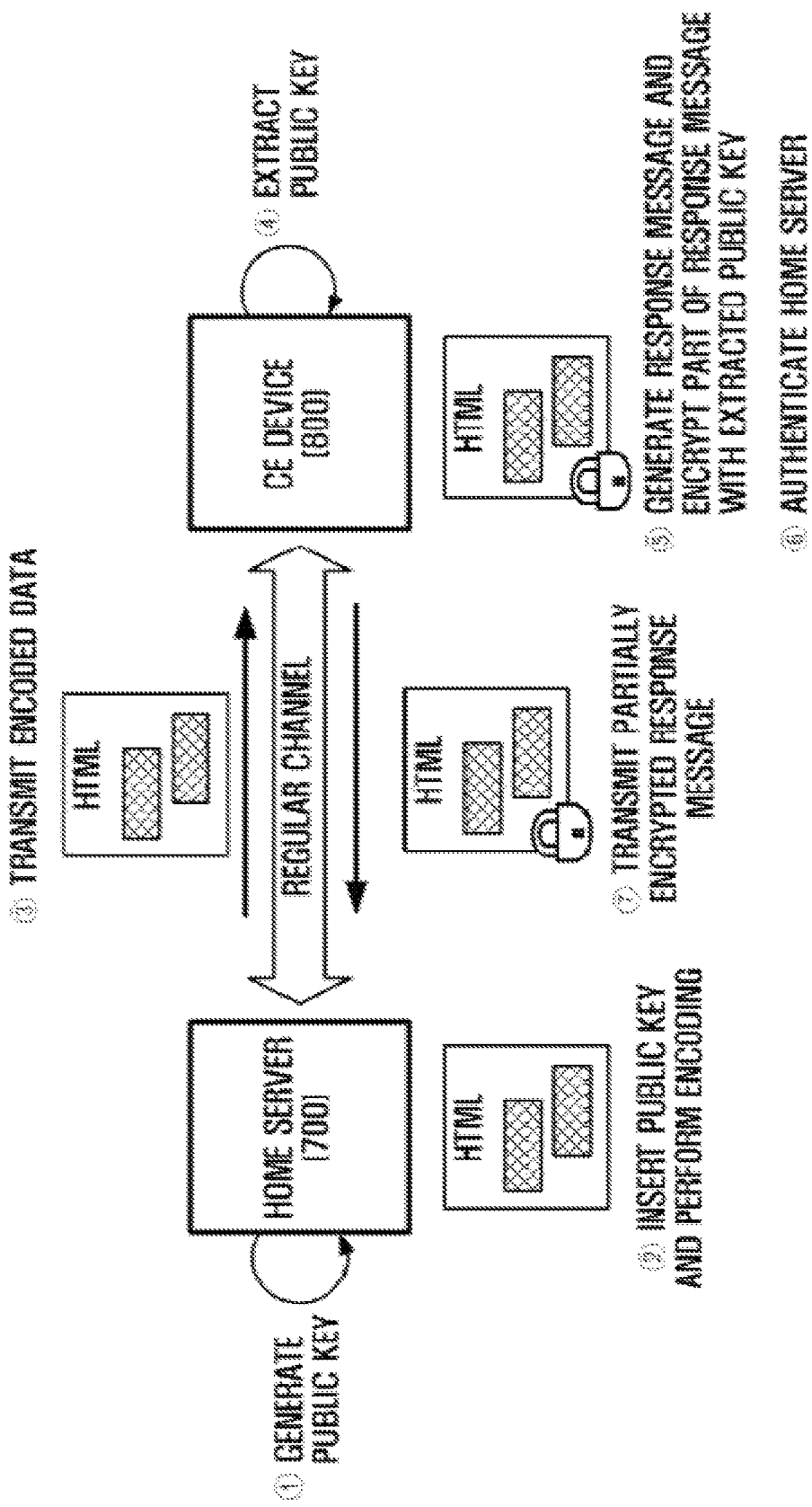
FIG. 5 illustrates a diagram for explaining the communication between a home server and a CE device when a secure channel does not exist between the home server and the CE device.

FIG. 5 illustrates a diagram for explaining the communication between the home server 700 and the CE device 800 when a secure channel does not exist between the home server 700 and the CE device 800.

Referring to FIG. 5, when a secure channel does not exist between the home server 700 and the CE device 800, the home server 700 may arbitrarily generate a pair of public keys for providing a security service to the CE device 800 (①). Once a pair of public keys is generated, the pair of public keys may be continuously used regardless whether a session between the home server 700 and the CE device 800 has been established. Alternatively, a pair of public keys may be generated whenever a session is established between the home server 700 and the CE device 800.

Once a pair of public keys is generated, the home server 700 may encode a web page marked with a security ID with the use of one of the pair of pubic keys (②) by inserting the corresponding public key into a Hyper-Text Markup Language (HTML) header of the web page, as illustrated in FIG. 3, or inserting the corresponding public key into an HTTP header of the web page. Thereafter, the home server 700 may transmit the encoded web page to the CE device 800 (③).

The CE device 800 receives the encoded web page from a regular channel and extracts a public key from the received web page (④). Thereafter, the CE device 800 creates a web document with reference to personal information of a user as a response message for the web page transmitted by the home server 700. For example, the CE device 800 may create an HTML document including the user's credit card number and social security number as a response message for the web page transmitted by the home server 700, as shown in FIG. 3. Thereafter, the CE 800 may encrypt each part of the HTML document enclosed by tags <secrecy> and </secrecy> (⑤). More specifically, the CE 800 may encrypt each part of the HTML document enclosed by tags <secrecy> and </secrecy> by using the public key extracted from the HTML header or the HTTP header of the received web page. Thereafter, the CE device 800 may authenticate the home server 700 (⑥). Once the home server 700 is successfully authenticated, the CE device 800 may transmit the HTML document, which is partially encrypted, to the home server 700 (⑦).

The authentication of the home server 700 may be performed using a standard shared secret key, which is shared between the home server 700 and the CE device 800, or using both the standard shared secret key and a temporary shared secret key, which is generated by the CE device 800 in order to authenticate the home server 700.

The authentication of the home server 700 with the use of a standard shared secret key will hereinafter be described in detail.

In order to transmit an encrypted web page to the CE device 800, the home server 700 may generate a message authentication code (MAC) based on a standard shared secret key held by the home server 700, attach the MAC to a web page, and transmit the web page to the CE device 800.

The CE device 800 receives the web page transmitted by the home server 700, and generates an MAC for the received web page by using a standard shared secret key held by the CE device 800. Thereafter, the CE device 800 compares the MAC included in the received web page with the MAC generated by the CE device 800. If the MAC included in the received web page and the MAC generated by the CE device 800 match, the CE device 800 may determine that the home server 700 is not harmful.

The authentication of the home server 700 with the aid of a standard shared secret key and a temporary shared secret key will hereinafter be described in detail with reference to FIG. 6.

Figure 6:
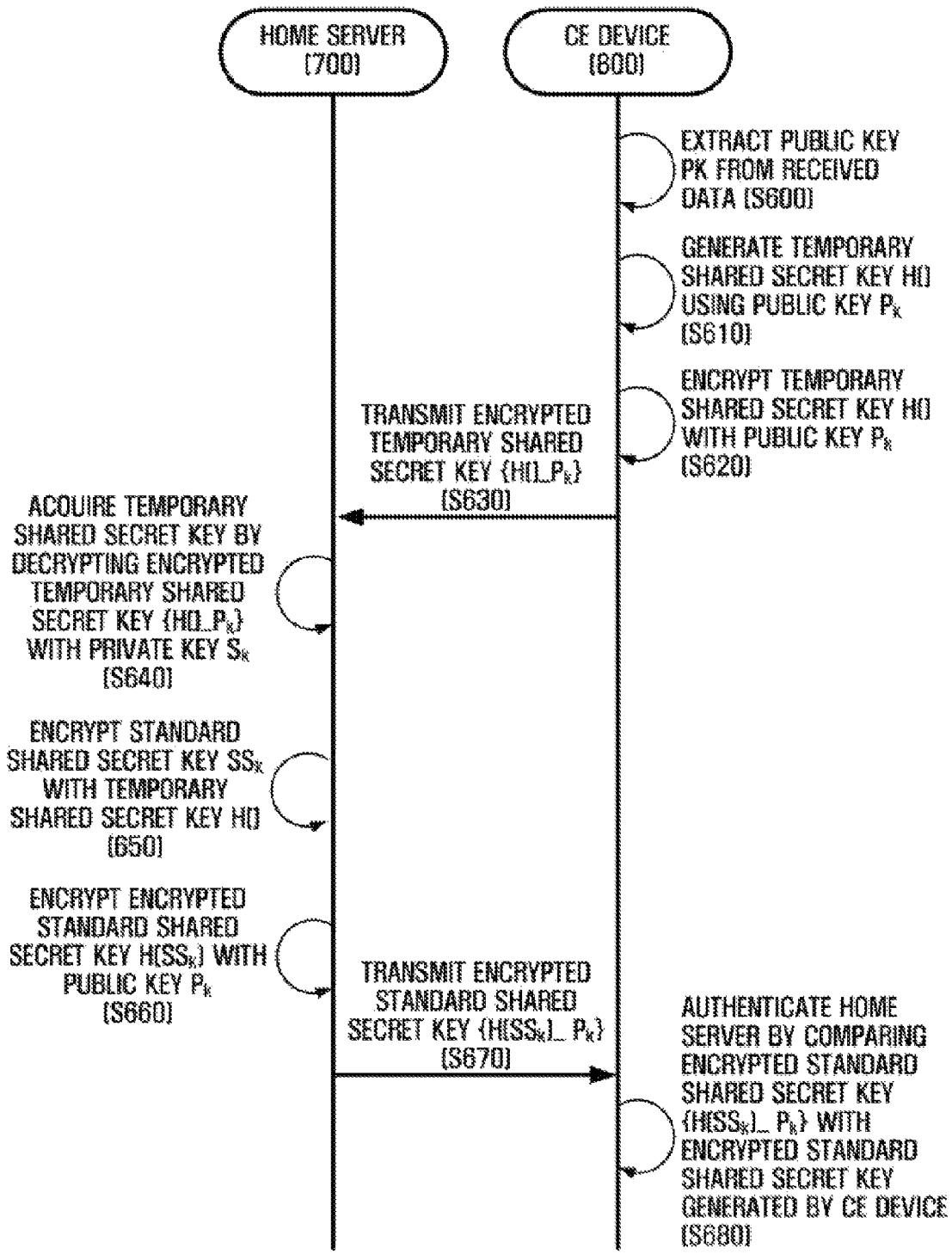
FIG. 6 illustrates a flowchart of the authentication of a home server according to an exemplary embodiment of the present invention.

Referring to FIG. 6, a public key $P_k$ is extracted from a received web page (S600). Then, the CE device 800 generates a hash value H( ) corresponding to the public key $P_k$ (S610). The CE device 800 may use the hash value H( ) as a temporary shared secret key. Thereafter, the CE device 800 encrypts the temporary shared secret key H( ) with the public key $P_k$ (S620), thereby obtaining an encrypted temporary shared secret key $\{H(\ )\}\_P_k$. Thereafter, the CE device 800 provides the encrypted temporary shared secret key $\{H(\ )\}\_P_k$ to the home server 700 (S630).

When the encrypted temporary shared secret key $\{H(\ )\}\_P_k$ is received, the home server 700 decrypts the encrypted temporary shared secret key $\{H(\ )\}\_P_k$ with a private key $S_k$, which is held by the home server 700, thereby restoring the temporary shared key H( ) (S640).

Thereafter, the home server 700 encrypts a standard shared secret key $SS_k$ with the temporary shared secret key H( ) (S650), thereby obtaining an encrypted standard shared secret key $H(SS_k)$. Then, the home server 700 encrypts the encrypted standard shared secret key $H(SS_k)$ with the public key $P_k$ (S660), thereby obtaining an encrypted standard shared secret key $\{H(SS_k)\}\_P_k$. Thereafter, the home server 700 transmits the encrypted standard shared secret key $\{H(SS_k)\}\_P_k$ to the CE device 800 (S670).

When the temporary shared secret key H( ) and the encrypted standard shared secret key $\{H(SS_k)\_\}P_k$ are received, the CE device 800 encrypts the standard shared secret key $SS_K$ with the public key $P_k$ and the temporary shared secret key H( ), and compares the result of the encryption with the encrypted standard shared secret key $\{H(SS_k)\}\_P_k$ (S680). If the result of the encryption performed in operation 5680 and the encrypted standard shared secret key $\{H(SS_k)\}\_P_k$ match, the CE device 800 may determine that the home server 700 is not harmful. On the other hand, if the result of the encryption performed in operation 5680 and the encrypted standard shared secret key $\{H(SS_k)\}\_P_k$ do not match, the CE device 800 may determine that the home server 700 is harmful, and thus stops transmitting data to or receiving data from the home server 700.

A standard shared secret key is a key that the home server 700 and the CE device 800 both agree to use during the authentication of the home server 700. A standard shared secret key may be a password, a passphrase or a numerical value, and may be stored in advance in the home server 700 or in the CE device 800. Alternatively, a standard shared secret key may be input to the CE device 800 by a user during the authentication of the home server 700.

The home server 700 and the CE device 800 will hereinafter be described in further detail with reference to FIGS. 7 and 8.

Figure 7:
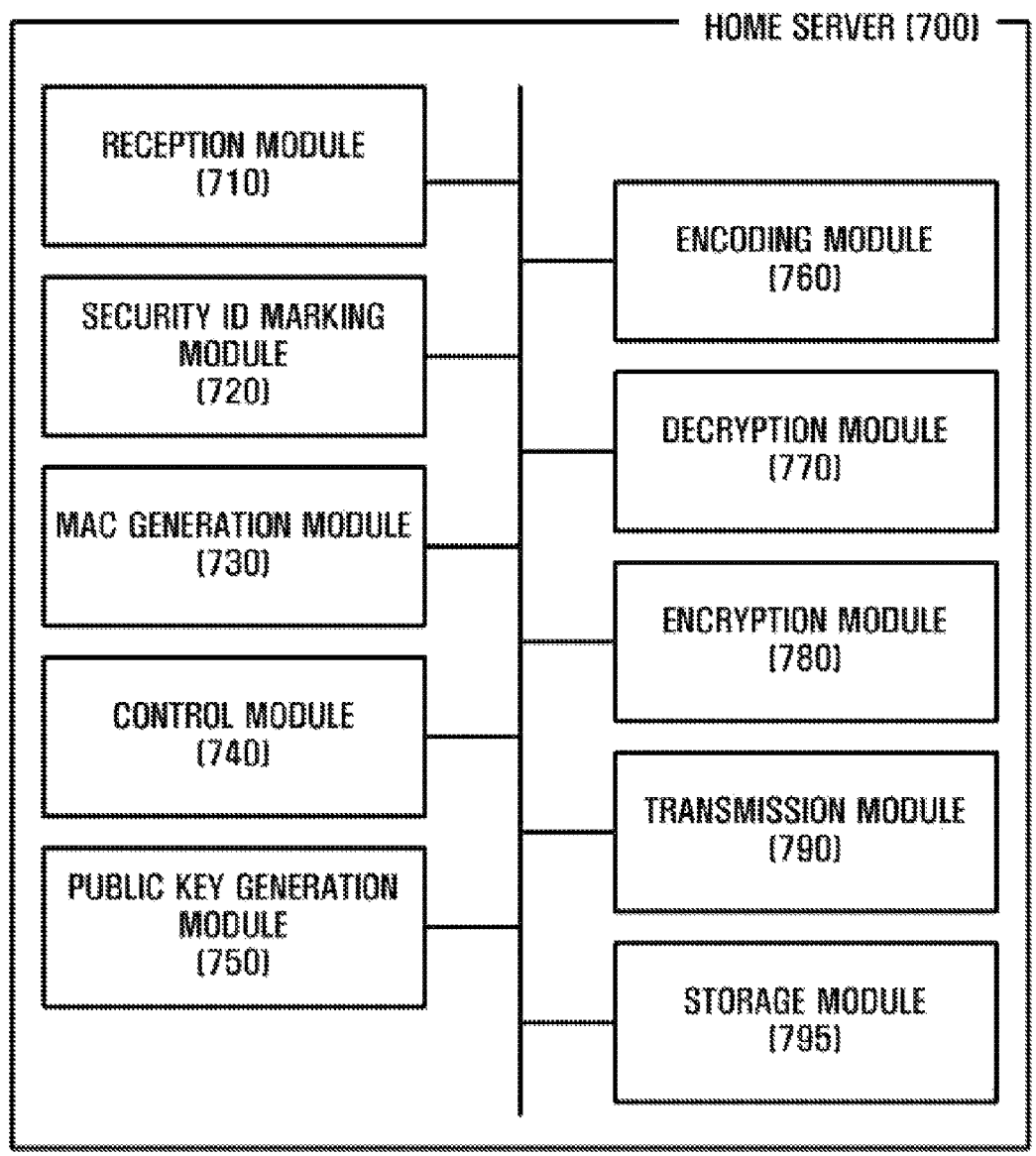
FIG. 7 illustrates a block diagram of a home server shown in FIG. 1.

FIG. 7 illustrates a block diagram of the home server 700 according to an embodiment of the present invention. Referring to FIG. 7, the home server 700 includes a reception module 710, a security ID marking module 720, an MAC generation module 730, a control module 740, a public key generation module 750, an encoding module 760, a decryption module 770, an encryption module 780, a transmission module 790, and a storage module 795.

The reception module 710 may receive a request from the CE device 800 and a response message transmitted by the CE device 800. In addition, the reception module 710 may receive a web page from a web server.

The security ID marking module 720 may mark each part of a received web page that needs to be secured with a security ID. A tag may be used as the security ID, as shown in FIG. 3.

The MAC generation module 730 generates an MAC for a web page to be transmitted to the CE device 800. More specifically, the MAC generation module 730 may generate an MAC using a standard shared secret key held by the home server 700, attach the MAC to a web page and transmit the web page to the CE device 800.

The control module 740 determines a method of transmitting a web page to the CE device 800 based on whether a secure channel such as SSL has been established between the home server 700 and the CE device 800.

More specifically, if a secure channel exists between the home server 700 and the CE device 800, the control module 740 may divide a web page into a first web page portion marked with a security ID and a second web page portion, transmit the first web page portion to the CE device 800 through the secure channel, and transmit the second web page portion to the CE device 800 through a regular channel.

On the other hand, if a secure channel does not exist between the home server 700 and the CE device 800, the control module 740 may transmit a web page to the CE device 800 through a regular channel.

The public key generation module 750 may arbitrarily generate a pair of public keys necessary for providing a security service to the CE device 800.

The encoding module 760 may encode a web page marked with a security ID. More specifically, the encoding module 760 may insert one of the pair of public keys generated by the public key generation module 750 into an HTML header or an HTTP header of a web page, thereby encoding the web page.

The decryption module 770 may decrypt encrypted information transmitted by the CE device 800. For example, the decryption module 770 may decrypt a temporary shared secret key encrypted with a public key by the CE device 800 with a private key of the home server 700, thereby restoring the temporary shared secret key.

The encryption module 780 may encrypt a standard shared secret key, which is held by the home server 700, with a public key and a temporary shared secret key.

The transmission module 790 may transmit information to the CE device 800. For example, the transmission module 790 may transmit a web page marked with a security ID to the CE device 800. If a secure channel such as SSL exists between the home server 700 and the CE device 800, the transmission module 790 may transmit part of a web page marked with a security ID to the CE device 800 through the secure channel, and transmit the other part of the web page without a security ID to the CE device 800 through a regular channel. In this manner, it is possible to decrease the complexity of messages for maintaining a secure channel. If a secure channel does not exist between the home server 700 and the CE device 800, the transmission module 700 may transmit a web page marked with a security ID to the CE device 800 through a regular channel.

The storage module 795 may store information necessary for providing a security service, for example, a public key for encrypting information, a private key for decrypting encrypted information, and a standard shared secret key for authenticating the home server 700. The storage module 795 may be a nonvolatile memory device such as a cache, a read only memory (ROM), a programmable ROM (PROM), an erasable programmable ROM (EPROM), an electrically erasable programmable ROM (EEPROM), or a flash memory; or a volatile memory device such as a random access memory (RAM). However, the present invention is not restricted to these memory devices.

Figure 8:
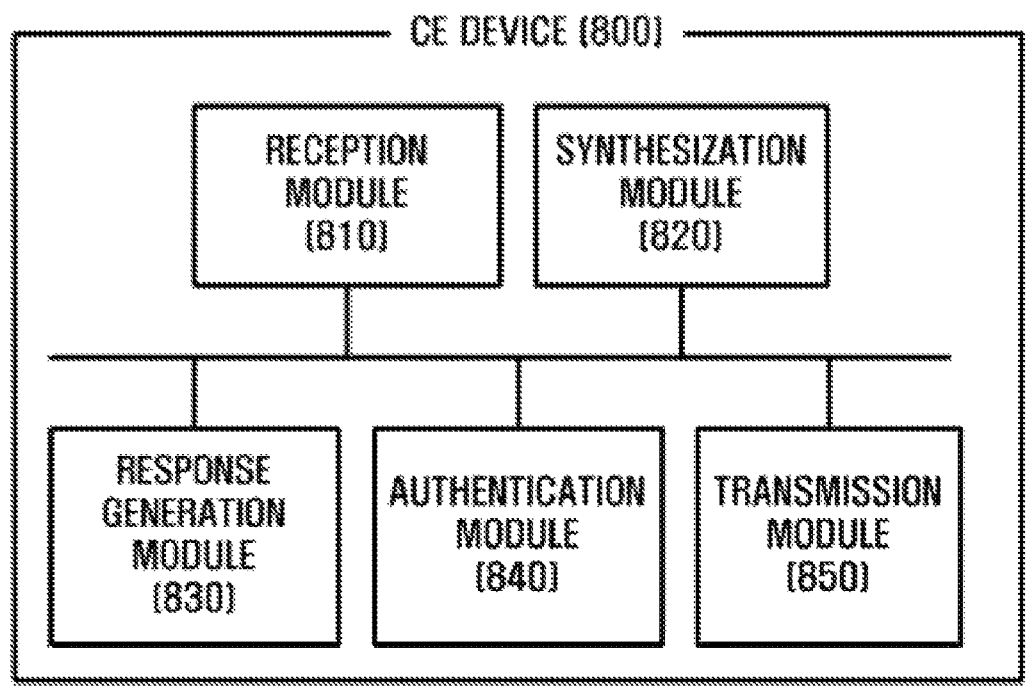
FIG. 8 illustrates a block diagram of a CE device shown in FIG. 1.

FIG. 8 illustrates a block diagram of the CE device 800 according to an exemplary embodiment of the present invention. Referring to FIG. 8, the CE device 800 includes a reception module 810, a synthesization module 820, a response generation module 830, an authentication module 840, and a transmission module 850.

The reception module 810 may receive information requested by the CE device 800 such as a web page from the home server 700. The reception module 810 may receive parts of a web page separately through a secure channel and a regular channel or receive a whole web page only through a regular channel.

The synthesization module 820 may synthesize a web page portion received from a secure channel and a web page portion received from a regular channel, thereby restoring a web page. In this manner, it is possible to provide a web page marked with a security ID to a user.

The response generation module 830 may generate a response message for a web page received from the home server 700 by the reception module 810. For example, the response generation module 830 may generate a web document including personal information of a user such as the user ID, password, social security number or credit card number as the response message. The response generation module 830 may encrypt part of the web document enclosed by tags <secrecy> and </secrecy> by using a public key extracted from the received web page.

The authentication module 840 may authenticate the home server 700. The authentication of the home server 700 may be performed using a standard shared secret key, which is shared in advance between the home server 700 and the CE device 800, or may be performed using both the standard shared secret key and a temporary shared secret key, which is obtained using a public key, as illustrated in FIG. 6.

The transmission module 850 may transmit information to the home server 700. For example, the transmission module 850 may transmit the response message generated by the response generation module 830 to the home server 700. If a secure channel exists between the CE device 800 and the home server 700, the transmission module 850 may transmit data that needs to be secured through the secure channel, and transmit data that does not need to be secured through a regular channel.

Each element described above, such as illustrated in FIG. 7 and FIG. 8, may be implemented as a kind of 'module.' The term 'module,' as used herein, includes, but is not limited to, a software and/or hardware component, such as a Field Programmable Gate-Array (FPGA) or Application-Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they are executed one or more computers in a communication system.

With this in mind, and in addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, the apparatus and method for providing security service in home network according to the exemplary embodiments of the present invention may have the following effects.

By encrypting data selectively and transmits the encrypted data when the device communicates with another device trough Remote UI application in the home network, decrease the amount of computation required for setting and maintaining security and decrease the complexity of messages when a plurality of devices communicate with each another in the home network.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. An apparatus for providing a security service in a home network, the apparatus comprising:
   a security-identifier (ID) marking module which marks with a security ID a portion of first data that needs to be encrypted;
   an encoding module which encodes a first public key and the first data, the first public key and a second public key being a pair of public keys necessary for providing a security service to a consumer electronics (CE) device in a home network;
   a transmission module which transmits the encoded first data to the CE device; and
   a reception module which receives second data from the CE device, the second data being obtained by encrypting part of a response message for the first data regarding the security ID with the first public key,
   wherein if a secure channel to the CE device exists, the transmission module transmits the portion of the first data which is marked with the security ID to the CE device through the secure channel and transmits another portion of the first data which is not marked with the security ID to the CE device through a regular channel, and if the secure channel to the CE device does not exist, the transmission module transmits all of the first data to the CE device through the regular channel.

2. The apparatus of claim 1, wherein the first data has a Hyper-Text Markup Language (HTML) format and the security ID comprises an HTML tag.

3. The apparatus of claim 2, wherein the first public key is inserted into an HTML header or a Hyper-Text Transmission Protocol (HTTP) header of the first data.

4. The apparatus of claim 1, further comprising:
   a decryption module which obtains a temporary shared secret key by decrypting an encrypted temporary shared secret key provided by the CE device with a private key, the encrypted temporary shared secret key being generated by extracting the first public key from the transmitted first data and encrypting the temporary shared secret key with the first public key; and
   an encryption module which encrypts a standard shared secret key shared with the CE device with the temporary shared secret key and the second public key,
   wherein the encrypted standard shared secret key is used in an authentication operation requested by the CE device.

5. The apparatus of claim 1, wherein the first and second public keys are generated for each session with the CE device.

6. An apparatus for providing a security service in a home network, the apparatus comprising:
   a reception module which receives first data including a first public key and marked with a security identifier (ID), the first public key and a second public key being a pair of public keys necessary for providing a security service to a home server and the security ID indicating that a portion of the first data which is marked with the security ID needs to be encrypted;
   a response generation module which generates second data by encrypting part of a response message for the first data; and
   a transmission module which transmits the second data to a home server in a home network, wherein the response generation module extracts the first public key from the first data and encrypts part of the response message regarding the security ID with the first public key, and wherein if a secure channel to the home server exists, the reception module receives the portion of the first data which is marked with the security ID through the secure channel and receives another portion of the first data which is not marked with the security ID through a regular channel, and if the secure channel to the home server does not exist, the reception module receives all of the first data through the regular channel.

7. The apparatus of claim 6, further comprising a synthesization module which synthesizes data received through the secure channel and data received through the regular channel.

8. The apparatus of claim 6, wherein the first data has a Hyper-Text Markup Language (HTML) format and the security ID comprises an HTML tag.

9. The apparatus of claim 6, further comprising an authentication module which encrypts a first standard shared secret key shared with the home server with the first public key and a temporary shared secret key, and determines that the home server is legitimate if the encrypted first standard shared secret key and an encrypted second standard shared secret key provided by the home server match, the temporary shared secret key being obtained using the first public key.

10. The apparatus of claim 9, wherein the home server acquires the temporary shared secret key by decrypting an encrypted temporary shared secret key, and generates the encrypted second standard shared secret key by encrypting a second standard shared secret key present therein with the second public key and the acquired temporary shared secret key, the encrypted temporary shared secret key being obtained by encrypting the original temporary shared secret key with the first public key.

11. A method of providing a security service in a home network, the method comprising:
marking with a security identifier (ID) a portion of first data that needs to be encrypted;
encoding a first public key and the first data, the first public key and a second public key being a pair of public keys necessary for providing a security service to a consumer electronics (CE) device in a home network;
transmitting the encoded first data to the CE device; and
receiving second data from the CE device, the second data being obtained by encrypting part of a response message for the first data regarding the security ID with the first public key,
wherein the transmitting comprises:
if a secure channel to the CE device exists, transmitting the portion of the first data which is marked with the security ID to the CE device through the secure channel and transmitting another portion of the first data which is not marked with the security ID to the CE device through a regular channel; and
if the secure channel to the CE device does not exist, the transmission module transmits all of the first data to the CE device through the regular channel.

12. The method of claim 11, wherein the first data has a Hyper-Text Markup Language (HTML) format and the security ID comprises an HTML tag.

13. The method of claim 12, wherein the first public key is inserted into an HTML header or a Hyper-Text Transmission Protocol (HTTP) header of the first data.

14. The method of claim 11, further comprising:
obtaining a temporary shared secret key by decrypting an encrypted temporary shared secret key provided by the CE device with a private key, the encrypted temporary shared secret key being generated by extracting the first public key from the first data and encrypting the temporary shared secret key with the first public key; and
encrypting a standard shared secret key shared with the CE device with the obtained temporary shared secret key and the second public key,
wherein the encrypted standard shared secret key is used in an authentication operation requested by the CE device.

15. The method of claim 11, wherein the first and second public keys are generated for each session with the CE device.

16. A method of providing a security service in a home network, the method comprising:
receiving first data, at a reception module, which includes a first public key and is marked with a security identifier (ID), the first public key and a second public key being a pair of public keys necessary for providing a security service to a home server and the security ID indicating that a portion of the first data marked with the security ID needs to be encrypted;
generating second data, at a response generating module, by encrypting part of a response message for the first data; and
transmitting the second data, though a transmission module, to a home server in a home network:
wherein the receiving comprises:
if a secure channel to the home server exists, receiving the portion of the first data which is marked with the security ID through the secure channel and receives another portion of the first data which is not marked with the security ID through a regular channel; and
if the secure channel to the home server does not exist, receiving all of the first data through the regular channel, and
Wherein the generating comprises:
extracting the first public key from the first data; and
encrypting part of the response message regarding the security ID with the first public key.

17. The method of claim 16, further comprising synthesizing data received through the secure channel and data received through the regular channel.

18. The method of claim 16, wherein the first data has a Hyper-Text Markup Language (HTML) format and the security ID comprises an HTML tag.

19. The method of claim 16, further comprising authenticating the home server, wherein:
the authenticating comprises encrypting a first standard shared secret key shared with the home server with the first public key and a temporary shared secret key; and
determining that the home server is legitimate if the encrypted first standard shared secret key and an encrypted second standard shared secret key provided by the home server match, the temporary shared secret key being obtained using the first public key.

20. The method of claim 19, wherein the home server acquires the temporary shared secret key by decrypting an encrypted temporary shared secret key, and generates the encrypted second standard shared secret key by encrypting a second standard shared secret key present therein with the second public key and the acquire temporary shared secret key, the encrypted temporary shared secret key being obtained by encrypting the original temporary shared secret key with the first public key.

* * * * *